Aug. 7, 1923.
J. RADON
SAFETY APPLIANCE FOR AEROPLANES
Filed Aug. 22, 1922 2 Sheets-Sheet 2
1,464,339
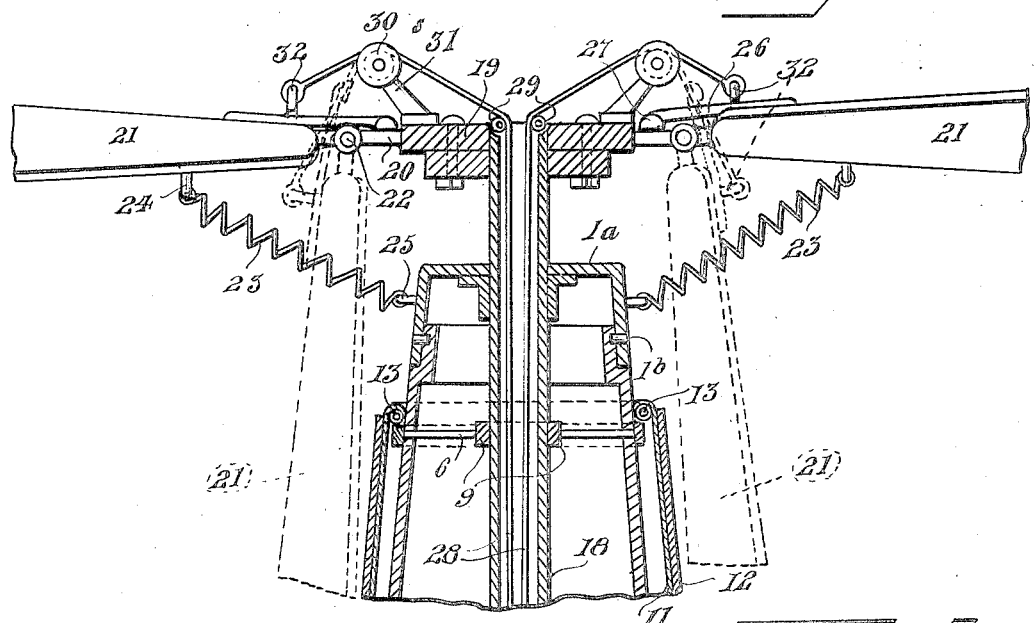
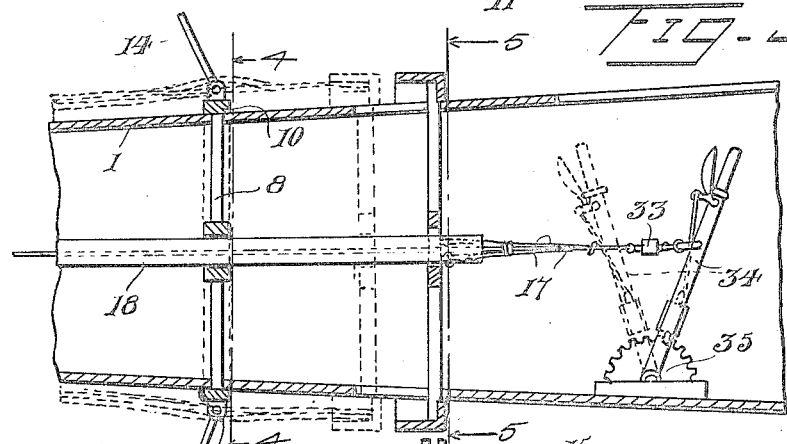
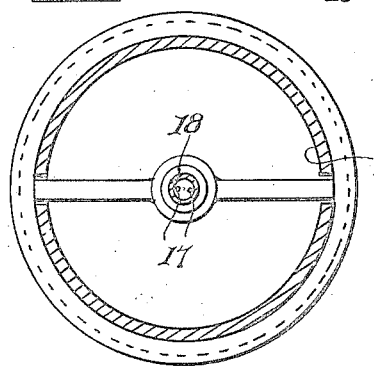
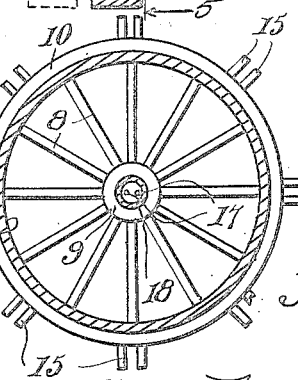
Inventor
Jan Radon
By J. K. Bryant
Attorney Patented Aug. 7, 1923.

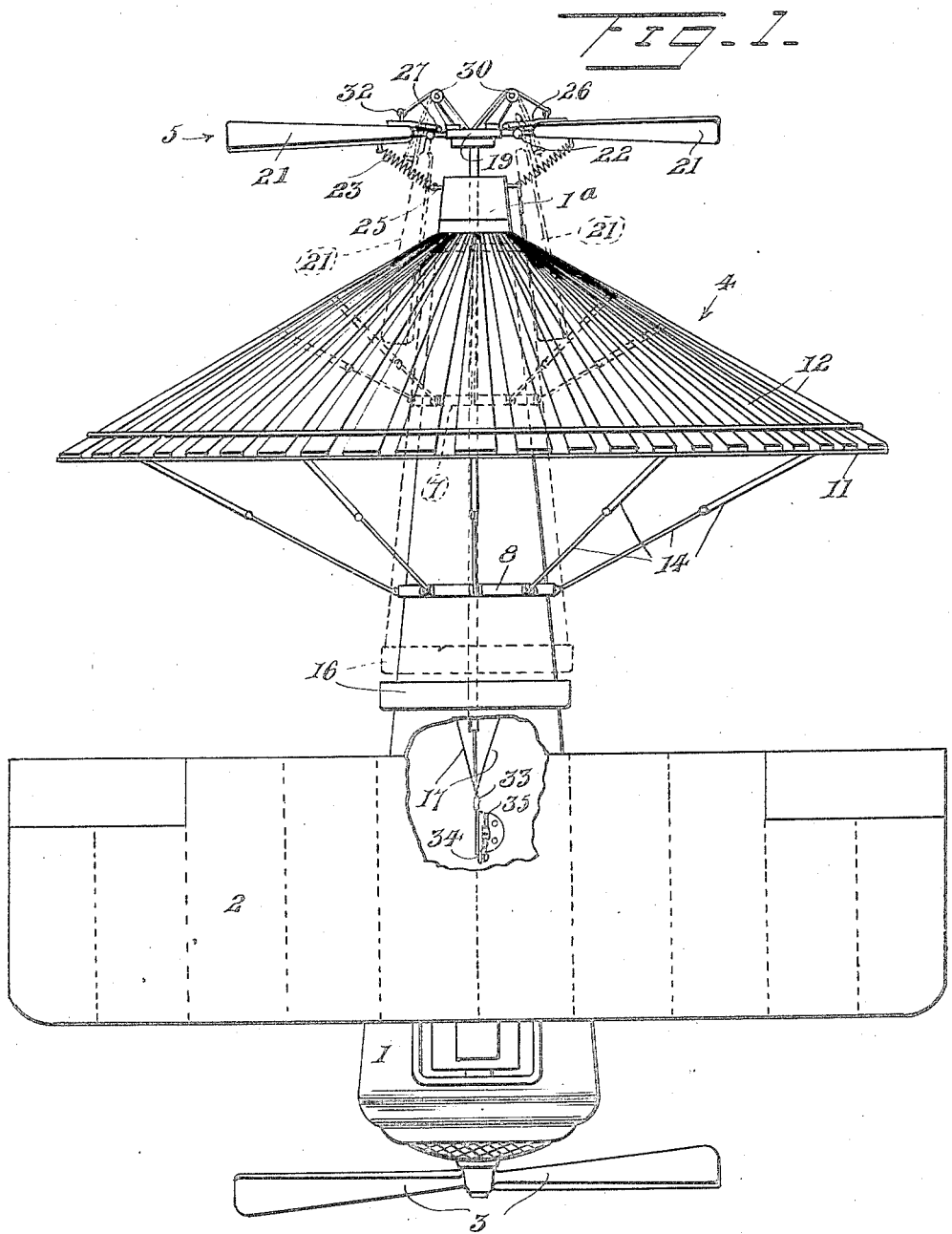

1,464,339

UNITED STATES PATENT OFFICE.

JAN RADON, OF EAST ST. LOUIS, ILLINOIS, ASSIGNOR OF ONE-HALF TO FRANCISZEK KLICH, OF EAST ST. LOUIS, ILLINOIS.

SAFETY APPLIANCE FOR AEROPLANES.

Application filed August 22, 1922. Serial No. 583,626.

*To all whom it may concern:*

Be it known that I, JAN RADON, a citizen of Poland, residing at East St. Louis, in the county of St. Clair and State of Illinois, have invented certain new and useful Improvements in Safety Appliances for Aeroplanes, of which the following is a specification.

This invention relates to certain new and useful improvements in safety appliances for aeroplanes and has particular reference to the provision of automatically opening parachute enclosing a portion of the fuselage to be opened upon the falling or such descent of the aeroplane to decrease the speed of descent and afford a safe landing thereof.

A further object of the invention has reference to an aeroplane provided with a safety appliance of the type above set forth with a propeller blade carried by the end of the fuselage, the blades of which are pivotally mounted for normally occupying a position adjacent the fuselage and adapted for manual operation to be moved outwardly thereof for rotation by air pressure thereon upon descent or falling of the aeroplane to retard the speed of descent.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a top plan view of an aeroplane, partly broken away and equipped with the present form of safety appliance, including a propeller blade at the rear end of the fuselage and a parachute enclosing a portion of the fuselage, Figure 2 is a fragmentary sectional view of the rear end of the fuselage showing the propeller blades associated therewith, the same being illustrated in full lines in their operative position, and retracted to their inoperative positions and shown by dotted lines, Figure 3 is a fragmentary longitudinal sectional view of a portion of the fuselage showing the sliding collar associated with the fuselage for confining the free opening ends of the parachute section and the lever arrangement for operating the safety propeller to shift the same to its open operative position, Figure 4 is a cross sectional view taken on line IV—IV of Fig. 3 showing a spider frame associated with the fuselage to which the outer ends of the parachute ribs are pivotally connected, and Figure 5 is a cross sectional view taken on line V—V of Fig. 3 showing the sliding collar enclosing the fuselage.

Referring more in detail to the accompanying drawings, there is illustrated an aeroplane embodying a fuselage 1 carrying a sustaining plane 2 and a forwardly positioned motor driven propeller 3. The present invention relating to a safety appliance for association with the aeroplane embodies a parachute 4 enclosing and associated with the rear end of the fuselage, while a propeller 5 carried by the rear end of the fuselage outwardly of the parachute cooperates with said parachute to retard the speed of descent of the aeroplane.

The parachute section 4 and the mounting thereof upon the fuselage 1 includes spaced spider frames 6, 7 and 8, each spider frame including an axle bearing ring 9 with the arms of the spider frame extending through openings in the fuselage 1 and carrying a collar 10 at the outer ends thereof positioned exteriorly of and enclosing said fuselage as clearly shown in the drawing. The parachute 4 embodies a fabric section 11 braced by outwardly positioned spaced flaps 12, the smaller end of the parachute being hinged as at 13 to the spider frame 6, while intermediate and end brace ribs 14 formed of hinged rods are pivotally mounted at their ends to the spaced pairs of lugs 15 carried by the collar 10 as shown in Figs. 3 and 4, while the outer ends of the hinged ribs 14 are pivoted to the parachute section 4 in the usual manner. A flanged collar 16 encloses and is slidably mounted upon the fuselage 1 for confining the free end of the parachute section 4 when the same is in a collapsed or closed position as shown by dotted lines in Figs. 1 and 3, operating cords 17 connected to said collar 15 being provided for shifting the collar to free the confined end of the parachute.

The safety propeller blade 5 and the mounting therefor embodies a tubular shaft 18 journaled longitudinally and axially of the fuselage 1 in the bearing rings 9 of the several spiders above mentioned, the tubular shaft 18 being journaled through the rear end 1ª of the fuselage is swiveled as at 1ᵇ upon the body of the fuselage as shown in Fig. 2. A disk head 19 is fixed to the rear projecting end of the tubular shaft 18 and carries outwardly directed bracket arms 20 upon which propeller blades 21 are pivotally mounted as at 22. The propeller blades 21 are caused normally to assume a position substantially parallel with the side walls of the body of the fuselage 1 by springs 23 connected as at 24 to the propeller blades 21 and the other ends thereof connected as at 25 to the swiveled ends 1ª of the fuselage. To limit the opening movement of the propeller blades 21 in the positions shown by full lines in Fig. 2, arms 26 carried by the propeller blades 21 have the ends 27 thereof adapted for engagement with the bracket arms 20 of the head 19 upon the tubular shaft 18. To operate the propeller arms 21, or in other words, to move the same from the dotted line position shown in Fig. 2 to the full line position, pull cords 28 extending through the tubular shaft 18 and passing over pulleys 29 at the outer open end of said shaft, further pass over pulleys 30 journaled upon bracket arms 31 carried by the shaft head 19 with the free ends thereof anchored as at 32 to the respective propeller blades 21. The opposite ends of the pull cords 28 extending inwardly of the body 1 of the fuselage are led into a single cord that has a swiveled connection 33 with the ratchet lever 34 operating over the segment 35 as shown in Fig. 3.

From the above detail description of the device, it is believed that the construction and operation thereof will at once be apparent, it being noted that when the aeroplane is flying in the usual manner, the parachute section 4 and the propeller blade 5 are collapsed to assume positions adjacent and enclosing the rear end of the body of the fuselage, the parachute being confined in its closed position by the flanged collar 16 engaging the free end of the parachute, while the propeller blades 21 are retained in a retracted position by the coil springs 23, Should the motor of the aeroplane be damaged or fail to operate, and the aeroplane make a sudden descent, the pull cords 17 attached to the collar 16 are connected to the pull cords 28 for the propeller blades, the pull cord 17 shifting the collar 16 to free the parachute section 4 and permit automatic opening movement thereof to the position shown in Fig. 1, the cords 17 being connected to the ratchet lever 34 that operates the pull cords 28 for shifting the propeller blades 21 against the tension of the springs 23 in a manner as will at once be obvious from an inspection of Figs. 2 and 3, the swiveled end 1ª of the fuselage body and the swivel connection 33 between the pull cords 28 and the ratchet lever 34 permitting rotation of the tubular shaft 18, the swiveled end 1ª supporting the same and the propeller blades 21 carried by the head 19 of the tubular shaft. Rotation of the propeller blades 21 by air pressure thereon will retard the speed of descent of the aeroplane, while the parachute section 4 practically insures a gradual descent and landing of the aeroplane without injury to the occupants thereof.

While there is herein shown and described the preferred embodiment of the present invention, it is nevertheless to be understood that minor changes may be made therein without departing from the spirit and scope of the invention as claimed.

What is claimed as new is:—

1. In a safety appliance for aeroplanes, the combination with a fuselage, of a tubular shaft journaled longitudinally and axially thereof, the rear end of the fuselage being swiveled upon the main body portion thereof and to which said tubular shaft is fixed, propeller blades hingedly associated with the outer projecting end of said tubular shaft, spring devices connecting said propeller blades to the swiveled end of the fuselage for normally holding the blades in a position adjacent said fuselage and means for swinging the propeller blades outwardly of the body of the fuselage to their operative positions.

2. In a safety appliance for aeroplanes, the combination with a fuselage, of a tubular shaft journaled longitudinally and axially thereof, the rear end of the fuselage being swiveled upon the main body portion thereof and to which said tubular shaft is fixed, propeller blades hingedly associated with the outer projecting end of said tubular shaft, spring devices connecting said propeller blades to the swiveled end of the fuselage for normally holding the blades in a position adjacent said fuselage, pull cords extending through said tubular shaft and connected to said propeller blades, and a ratchet lever and segment associated with the inner ends of said pull cords for moving the same to shift the propeller blades to their extended operative positions.

3. In a safety appliance for aeroplanes, the combination with a fuselage, of a tubular shaft journaled longitudinally and axially thereof, the rear end of the fuselage being swiveled upon the main body portion thereof and to which said tubular shaft is fixed, propeller blades hingedly associated with the outer propecting end of said tubular shaft, spring devices connecting said propeller blades to the swiveled end of the fuselage for normally holding the blades in a position adjacent said fuselage, means for swinging the propeller blades outwardly of the body of the fuselage to their operative positions, and an automatically opening parachute enclosing the rear end of the fuselage and spaced inwardly of said propeller blades.

4. In a safety appliance for aeroplanes, the combination with a fuselage, of a tubular shaft journaled longitudinally and axially thereof, the rear end of the fuselage being swiveled upon the main body portion thereof and to which said tubular shaft is fixed, propeller blades hingedly associated with the outer projecting end of said tubular shaft, spring devices connecting said propeller blades to the swiveled end of the fuselage for normally holding the blades in a position adjacent said fuselage, pull cords extending through said tubular shaft and connected to said propeller blades, a ratchet lever and segment associated with the inner ends of said pull cords for moving the same to shift the propeller blades to their extended operative positions, and an automatically opening parachute enclosing the rear end of the fuselage and spaced inwardly of said propeller blades.

5. In a safety appliance for aeroplanes, the combination with a fuselage, of a tubular shaft journaled longitudinally and axially thereof, the rear end of the fuselage being swiveled upon the main body portion thereof and to which said tubular shaft is fixed, propeller blades hingedly associated with the outer projecting end of said tubular shaft, spring devices connecting said propeller blades to the swiveled end of the fuselage for normally holding the blades in a position adjacent said fuselage, means for swinging the propeller blades outwardly of the body of the fuselage to their operative positions, an automatically opening parachute enclosing the rear end of the fuselage and spaced inwardly of said propeller blades, a flanged collar enclosing and slidably mounted upon the fuselage for confining the opening end of the parachute, and cross connections between said flanged collar and said ratchet lever.

6. In a safety appliance for aeroplanes, the combination with a fuselage, of a tubular shaft journaled longitudinally and axially thereof, the rear end of the fuselage being swiveled upon the main body portion thereof and to which said tubular shaft is fixed, propeller blades hingedly associated with the outer projecting end of said tubular shaft, spring devices connecting said propeller blades to the swiveled end of the fuselage for normally holding the blades in a position adjacent said fuselage, pull cords extending through said tubular shaft and connected to said propeller blades, a ratchet lever and segment associated with the inner ends of said pull cords for moving the same to shift the propeller blades to their extended operative positions, an automatically opening parachute enclosing the rear end of the fuselage and spaced inwardly of said propeller blades, a flanged collar enclosing and slidably mounted upon the fuselage for confining the opening end of the parachute, and cross connections between said flanged collar and said ratchet lever.

In testimony whereof I affix my signature.

JAN RADON.